(12) United States Patent
Dinkel et al.

(10) Patent No.: US 12,510,251 B2
(45) Date of Patent: Dec. 30, 2025

(54) DOOR AND DOMESTIC COOKING DEVICE (71) Applicant: BSH Hausgeräte GmbH, Munich (DE)

(72) Inventors: Alexander Dinkel, Unterwoessen (DE); Frederic Dubois, Trostberg (DE); Peter Jell, Breitbrunn (DE); Christine Thaller, Waging (DE)

(73) Assignee: BSH Hausgeräte GmbH, Munich (DE)

( * ) Notice: Subject to any disclaimer, the term of this patent is extended or adjusted under 35 U.S.C. 154(b) by 464 days.

(21) Appl. No.: 18/016,689

(22) PCT Filed: Jul. 7, 2021

(86) PCT No.: PCT/EP2021/068841
§ 371 (c)(1),
(2) Date: Jan. 18, 2023

(87) PCT Pub. No.: WO2022/017795
PCT Pub. Date: Jan. 27, 2022

(65) Prior Publication Data
US 2023/0280042 A1    Sep. 7, 2023

(30) Foreign Application Priority Data
Jul. 22, 2020 (DE) .......................... 102020209248.6

(51) Int. Cl.
*F24C 15/04*    (2006.01)
(52) U.S. Cl.
CPC .................................. *F24C 15/045* (2013.01)
(58) Field of Classification Search
CPC .................................................... F24C 15/045
(Continued)

(56) References Cited

U.S. PATENT DOCUMENTS

| 10,948,195 B2 | 3/2021 | Grobleben |
| 2005/0028805 A1* | 2/2005 | Bronstering .......... F24C 15/045 |
| | | 126/194 |

(Continued)

FOREIGN PATENT DOCUMENTS

| CN | 104106983 A1 | 10/2014 |
| CN | 104847198 A | 8/2015 |

(Continued)

OTHER PUBLICATIONS

Machine Translation of DE 10219349 (Year: 2003).*

(Continued)

*Primary Examiner* — Allen R. B. Schult
*Assistant Examiner* — Amy E Carter
(74) *Attorney, Agent, or Firm* — Michael E. Tschupp; Andre Pallapies; Brandon G. Braun (57) ABSTRACT

A door for a household cooking appliance includes an outer pane, an inner pane, an intermediate pane arranged between the outer pane and the inner pane, a pane checking facility mounted on the door for rotation about a pivot axis from a starting position into an end position when, the intermediate pane is inserted in a direction of the outer pane, and a locking facility mounted so as to be displaceable on the door from an unlocked state, in which the locking facility is out of engagement with the inner pane, into a locked state, in which the locking facility engages around the inner pane at least in one section. The locking facility is displaceable from the unlocked state into the locked state only when the pane checking facility is located in the end position.

20 Claims, 9 Drawing Sheets

(58) Field of Classification Search
USPC .................................................. 126/190, 198
See application file for complete search history.

(56) References Cited

U.S. PATENT DOCUMENTS

| | | | | |
|---|---|---|---|---|
| 2011/0044754 A1* | 2/2011 | Bronstering | .......... | F24C 15/045 403/315 |
| 2016/0290658 A1* | 10/2016 | Phillips | ................ | F24C 15/028 |
| 2019/0257526 A1 | 8/2019 | Streitwieser | | |

FOREIGN PATENT DOCUMENTS

| | | | | |
|---|---|---|---|---|
| DE | 10219349 A1 * | 11/2003 | ............ | F24C 15/045 |
| DE | 102010041027 A1 * | 3/2012 | ............ | F24C 15/045 |
| DE | 102015220719 A1 | 4/2017 | | |
| EP | 2244017 A2 | 10/2010 | | |
| EP | 2400226 A1 | 12/2011 | | |
| EP | 3324126 B1 | 6/2020 | | |
| WO | WO-2014207602 A2 * | 12/2014 | ............ | F24C 15/045 |
| WO | 2014207602 A3 | 4/2015 | | |
| WO | 2015165499 A1 | 11/2015 | | |

OTHER PUBLICATIONS

DE 102010041027 with Machine Translation (Year: 2012).*
National Receipt Search Report DE 10 2020 209 248.6 dated Mar. 9, 2021.
International Search Report PCT/EP2021 /068841 dated Sep. 22, 2021.
NNational Search Report CN 202180059783.9 dated Aug. 18, 2025.

* cited by examiner

DOOR AND DOMESTIC COOKING DEVICE

CROSS-REFERENCES TO RELATED APPLICATIONS

This application is the U.S. National Stage of International Application No. PCT/EP2021/068841, filed Jul. 7, 2021, which designated the United States and has been published as International Publication No. WO 2022/017795 A1 and which claims the priority of German Patent Application, Serial No. 10 2020 209 248.6, filed Jul. 22, 2020, pursuant to 35 U.S.C. 119(a)-(d).

The contents of International Application No. PCT/EP2021/068841 and German Patent Application, Serial No. 10 2020 209 248.6 are incorporated herein by reference in their entireties as if fully set forth herein.

BACKGROUND OF THE INVENTION

The present invention relates to a door for a household cooking appliance and a household cooking appliance having such a door.

A household cooking appliance can have a cooking compartment having a door that is fastened in a pivotable manner to the cooking compartment. The door can have an inner pane that faces the cooking compartment, an outer pane that is remote from the cooking compartment and also an intermediate pane that is arranged between the inner pane and the outer pane. In the case of household cooking appliances having ventilated doors, it can be necessary to dismantle the door in order to clean the inner pane and the intermediate pane. It is therefore desirable that the door can be easily dismantled.

BRIEF SUMMARY OF THE INVENTION

Against this background an object of the present invention is to provide an improved door for a household cooking appliance.

Accordingly, a door for a household cooking appliance is proposed. The door comprises an outer pane, an inner pane, at least one intermediate pane that is arranged between the outer pane and the inner pane, a pane checking facility that is mounted on the door so as to be rotatable about a pivot axis, wherein as the at least one intermediate pane is being inserted in the direction of the outer pane the pane checking facility pivots about the pivot axis from a starting position into an end position, and a locking facility that is mounted so as to be displaceable on the door and that can be displaced from an unlocked state, in which the locking facility is out of engagement with the inner pane, into a locked state, in which the locking facility engages around the inner pane at least in sections, wherein the locking facility can only be displaced from the unlocked state into the locked state if the pane checking facility is located in the end position.

Due to the fact that the locking facility can only then be displaced from the unlocked state into the locked state if the pane checking facility is located in the end position, it is automatically possible to check whether the intermediate pane is correctly mounted. In the event of multiple intermediate panes being provided, it is possible to check whether one of the intermediate panes is missing. For the case in which the intermediate pane is not mounted or the intermediate panes are not mounted, the pane checking facility is also not pivoted from the starting position into the end position with the result that the locking facility can also not be brought from the unlocked state into the locked state.

As a consequence, it is possible to realize an automated check for whether the intermediate pane is correctly mounted.

In particular, all the intermediate panes are required in order to reach the end position. This means that the pane checking facility cannot be brought into the end position as long as one of the intermediate panes is missing. The household cooking appliance can be a stove, an oven, a microwave combination oven, a double oven or the like. It is preferred that the household cooking appliance comprises a cooking compartment and the door is fixed for example in a pivotable manner to the cooking compartment. It is possible to provide hinges for this purpose. The hinges can be coupled to a door beam of the door. This is however not mandatorily required. The door can alternatively also be arranged on a baking rack or the like that can be pulled out of the cooking compartment. In this case, the door is not fastened to the cooking compartment in a pivotable manner but rather can be displaced in a linear manner with respect to this cooking compartment.

In particular, the door comprises at least one door beam. The door beam is arranged in particular between the inner pane and the outer pane. The door beam is in particular fixedly connected to the outer pane. It is preferred that two door beams are provided, namely a first door beam and a second door beam that are fixedly connected to the outer pane. The door beams are attached to the side of the outer pane and in the case of the closed door run along a y-direction or height direction of the household cooking appliance or the door. The door beams are attached to the rear side of the outer pane, for example are adhesively bonded to this outer pane. The pane checking facility can be rotatably mounted on one of the door beams. The pane checking facility can however also be rotatably mounted on any arbitrary other component of the door. It is preferred that the pivot axis is oriented parallel to the height direction. This means that the pivot axis is positioned vertically. The pivot axis can however also be oriented parallel to an x-direction or width direction of the household cooking appliance or the door. In this case, the pivot axis is positioned horizontally. It is also preferred that the locking facility is mounted on the door beam. However, the locking facility can also be mounted on any other component of the door.

The door can preferably be dismounted from the cooking compartment with the result that the door can be dismantled and reassembled in its state in which it is dismounted from the cooking compartment. Moreover, the door can also be disassembled and reassembled in a state in which the door is mounted on the cooking compartment. The pane checking facility is in particular suitable for positioning and thus mounting the inner pane and the intermediate pane on the door. The door can also be dismounted again with the aid of the pane checking facility. The pane checking facility can also be referred to as an assembling and disassembling facility. The pane checking facility can moreover also be referred to as a pane receiving arrangement or pane receiving facility. The locking facility can also be referred to as a sliding cap or sliding cap facility.

The outer pane, the inner pane and the intermediate pane are preferably at least in sections transparent. The number of intermediate panes is essentially arbitrary. For example, it is possible to provide one intermediate pane. It is however also possible to provide two intermediate panes or three intermediate panes. The intermediate pane or the intermediate panes can be produced from glass, a sol-gel, a polycarbonate or the like. Alternatively, the intermediate pane or the intermediate panes can be designed as a screen of metal, non-ferrous metal or plastic. As the intermediate pane is being inserted in the direction of the outer pane, the intermediate pane is in particular placed on the pane checking facility whereby this intermediate pane rotates about the pivot axis. As a consequence, the pane checking facility is brought from the starting position into the end position. Between the starting position and the end position it is possible to provide an intermediate position of the pane checking facility.

The fact that the locking facility in the unlocked state is "out of engagement" with the inner pane in the present case means that the locking facility in the unlocked state does not hold the inner pane and in particular also does not contact this inner pane. The fact that the locking facility in the locked state "engages" around the inner pane at least in sections in the present case means that the locking facility contacts the inner pane and in particular is in a positive-locking engagement with this inner pane. A positive-locking connection results due to the engagement of two connecting partners into one another or behind, in the present case the inner pane and the locking facility. The locking facility for this purpose can have a pocket-shaped engaging section that can engage around an upper edge of the inner pane.

In accordance with one embodiment, the door moreover comprises at least one door beam that is fixedly or detachably connected to the outer pane.

A "fixed" connection in the present case can be understood to mean a positive-locking connection, a non-positive locking connection or an integrally bonded connection. For example, the door beam can be adhesively bonded to, screwed to or mounted in this outer pane. "Fixedly" however does not rule out that the connection can again be separated. For example, a positive-locking connection can thus be detached again without damaging the door beam or the outer pane. As mentioned above, it is preferred that two door beams are provided that are arranged on the side of the outer pane.

In accordance with a further embodiment, the pane checking facility is mounted on the at least one door beam so as to be rotatable about the pivot axis.

The pane checking facility can however, as mentioned above, also be mounted on any other arbitrary component of the door so as to be rotatable about the pivot axis.

In accordance with a further embodiment, the locking facility is mounted so as to be displaceable on the at least one door beam.

The locking facility can however also be mounted so as to be displaceable on any other component of the door.

In accordance with a further embodiment, the locking facility can be displaced along the at least one door beam from the unlocked state into the locked state.

The locking facility in this case performs a linear movement along the door beam.

In accordance with a further embodiment, the at least one door beam is adhesively bonded to the outer pane.

As a consequence, a reliable connection of the door beam to the outer pane is ensured.

In accordance with a further embodiment, the at least one door beam is produced from a plastic material.

Alternatively, the door beam can also be produced from a metal. For example, the door beam can be produced from acrylonitrile butadiene styrene (ABS), in particular from a fiber reinforced ABS. Alternatively, an arbitrary other plastic material can also be used. It is possible due to the use of a plastic material for the door beam to produce this in a cost effective manner as a plastic injection molded component. The pane checking facility and the locking facility can be designed as plastic components. It is preferred that the pane checking facility and the locking facility are likewise designed as plastic injection molded components.

In accordance with a further embodiment, the door comprises a first door beam and a second door beam, wherein each door beam comprises a pane checking facility and a locking facility.

In particular, the two locking facilities and the two pane checking facilities are provided on an upper edge of the door. In particular, a locking facility is allocated to each pane checking facility.

In accordance with one embodiment, the pane checking facility comprises a spring element that prestresses the pane checking facility in the direction of the starting position.

In the starting position, the spring element is in particular approximately relaxed or free of force. The spring element is however prestressed to a minimal extent with the result that the pane checking facility is held in the starting position. The pane checking facility can be brought from the starting position via an intermediate position or multiple intermediate positions into the end position. In the mounted state of the door, the pane checking facility is in its end state. In the end state, the spring element is prestressed to its maximum extent. The fact that the spring element "prestresses" the pane checking facility in the direction of the starting position in the present case means that the pane checking facility can be brought from the starting position into the end position due to the application of a force, namely due to the placement of the intermediate pane. As soon as the force is no longer acting, this means that as soon as the intermediate pane is no longer lying on the pane checking facility, this pane checking facility independently brings itself back from the end position into the starting position. The spring element is in particular a cylindrical helical coiled spring or torsion spring. The spring element can also be a leaf spring. The spring element is in particular suitable for applying a torque to the pivot axis.

In accordance with a further embodiment, the locking facility comprises a locking section that in the locked state engages in a positive-locking manner into the pane checking facility.

The locking section is in particular rod-shaped or bar-shaped. As soon as the locking facility is in the locked state, the locking section blocks the pane checking facility in such a manner that this pane checking facility can no longer be twisted about the pivot axis. This means that as soon as the locking facility is in the locked state, the pane checking facility can no longer be brought from the end position back into the starting position.

In accordance with a further embodiment, the pane checking facility comprises multiple arms, wherein the at least one intermediate pane lies on one of the arms as the intermediate pane is being inserted in the direction of the outer pane with the result that the pane checking facility pivots about the pivot axis.

The pane checking facility pivots about the pivot axis due to the placement of the intermediate pane on the respective arm, wherein the spring element is stressed.

In accordance with a further embodiment, in the locked state the locking section engages around or engages behind one of the arms.

"Engage around" or "engage behind" in the present case means that in the locked state the locking section blocks the respective arm with the aid of a positive-locking engagement with the result that the rotational movement of the pane checking facility about the pivot axis is blocked.

In accordance with a further embodiment, the door comprises a first intermediate pane and a second intermediate pane, wherein the first intermediate pane is arranged between the outer pane and the second intermediate pane, wherein the second intermediate pane is arranged between the inner pane and the first intermediate pane, wherein as the first intermediate pane is being inserted in the direction of the outer pane the pane checking facility pivots about the pivot axis from the starting position into an intermediate position, and wherein as the second intermediate pane is being inserted in the direction of the outer pane the pane checking facility pivots about the pivot axis from the intermediate position into the end position.

The intermediate position is optional. For the case in which only one intermediate pane is provided, the pane checking facility is brought from the starting position into the end position due to the placement of the intermediate pane.

In accordance with a further embodiment, the pivot axis is oriented parallel to a y-direction of the door or parallel to an x-direction of the door.

In the first case, the pivot axis is arranged vertically. In the second case, the pivot axis is arranged horizontally. As mentioned above, the y-direction can also be referred to as the height direction and the x-direction can also be referred to as the width direction.

Moreover, a household cooking appliance is proposed having a cooking compartment and a door that is fastened to the cooking compartment.

The household cooking appliance, as mentioned above, can be a stove, an oven, a microwave combination oven, a double oven or the like. "Fastened" in the present case means that the door is connected to the cooking compartment for example so that the door can pivot in a vertical or horizontal manner. Alternatively, the door can also be arranged on a baking rack or the like that can be moved out of the cooking compartment. In this case, the door is not mounted on the cooking compartment in a pivotable manner but rather can be displaced or can be moved in a linear manner with respect to this cooking compartment. The door can however perform any arbitrary movement as the door is being opened.

Further possible implementations of the door and/or the household cooking appliance also comprise combinations, which are not explicitly mentioned, of features or embodiments that are described below in relation to the exemplary embodiments. In this case, the person skilled in the art will also add individual aspects as improvements or additions to the respective basic form of the door and/or of the household cooking appliance.

BRIEF DESCRIPTION OF THE DRAWINGS

Further advantageous embodiments and aspects of the door and/or of the household cooking appliance are the subject matter of the subordinate claims and also of the exemplary embodiments of the door and/or of the household cooking appliance that are described below. Furthermore, the door and/or the household cooking appliance are further explained with the aid of preferred embodiments with reference to the attached figures.

DETAILED DESCRIPTION OF EXEMPLARY EMBODIMENTS OF THE PRESENT INVENTION

In the figures, identical or functionally identical elements have been provided with the same reference characters provided that nothing different is indicated.

Figure 1:
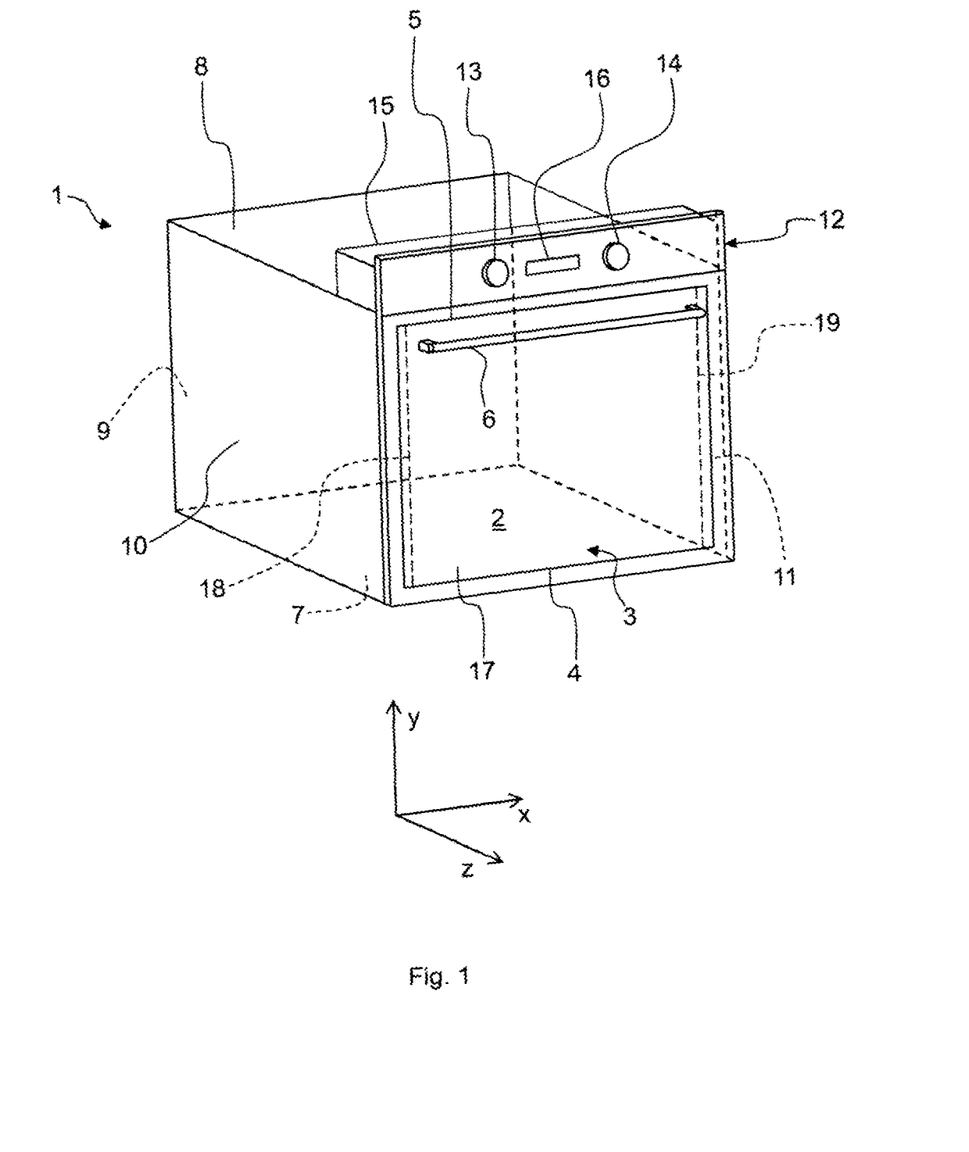
FIG. 1 shows a schematic perspective view of an embodiment of a household cooking appliance.

FIG. 1 illustrates a schematic perspective view of an embodiment of a household cooking appliance 1. The household cooking appliance 1 can be a stove, an oven, a microwave combination oven, a double oven or the like. The household cooking appliance 1 has a cooking compartment 2 that can be closed with the aid of a door 3. The cooking compartment 2 can also be referred to as a muffle or oven muffle. The cooking compartment 2 can be arranged in the interior of a housing of the household cooking appliance 1. The door 3 is illustrated in FIG. 1 in a closed position. It is possible to close or open the door 3 due to pivoting about a pivot axis that is provided on a lower end of the door 3 or a lower edge 4 of the door 3. Alternatively, the door 3 can be fastened to the side of the cooking compartment 2. Moreover, the door 3 can be arranged on a baking rack that can be pulled out of the cooking compartment 2. The movement type of the door 3 as the door 3 is being opened however can be selected arbitrarily. This means that the door 3 can essentially perform any arbitrary movement as it is being opened.

It is possible to provide a grip 6 on an upper section or on an upper edge 5 of the door 3. The cooking compartment 2 has a floor 7, a ceiling 8 that is arranged lying opposite the floor 7, a rear wall 9 that is arranged lying opposite the closed door 3 and two side walls 10, 11 that are arranged lying opposite one another. The cooking compartment 2 is preferably cuboid or cube-shaped. The cooking compartment 2 can be produced from a metal material, in particular from a steel sheet.

The household cooking appliance 1 furthermore comprises control knobs 13, 14 that are provided on a switch panel or control panel 12. The control knobs 13, 14 can be for example rotatable. A control facility 15, which is only illustrated schematically, for controlling the household cooking appliance 1 can be provided on the rear side on the control panel 12. The control facility 15 can be a regulating facility and/or control facility. Furthermore a notification display 16 can be provided on the control panel 12. With the aid of the notification display 16 it is possible to display an operating state of the household cooking appliance 1. For example, it is possible with the aid of the notification display 16 to display a temperature that is set with the aid of one of the control knobs 13, 14.

The household cooking appliance apparatus 1 can be capable of pyrolysis. This means that the cooking compartment 2 can be burned out with the aid of an accordingly high temperature. Dirt that is stuck to the inside of the cooking compartment 2 and to the door 3 is in this case carbonized with the result that this dirt either falls off itself or can be easily removed. This pyrolysis function is however not mandatorily required. The door 3 is a ventilated door. This means that an air flow is guided through the door 3.

A coordinate system having a width direction or x-direction x, a height direction or y-direction y and a depth direction or z-direction z is allocated to the household cooking appliance 1 or to the door 3. The directions x, y, z are oriented perpendicular to one another. The door 3 comprises an outer pane 17 that lies in a plane that is spanned by the x-direction x and the y-direction y. A first door beam 18 and a second door beam 19 are attached to the outer pane 17 on the rear side, in other words facing the cooking compartment 2. When the door 3 is closed, the door beams 18, 19 extend along the y-direction y. The door beams 18, 19 are preferably affixed on the rear side to the outer pane 17. The door beams 18, 19 are produced from a plastic material. Hinges that are not illustrated can be attached to the door beams 18, 19 with the result that the door 3 can be attached to the cooking compartment 2 in a pivotable manner.

Figure 2:
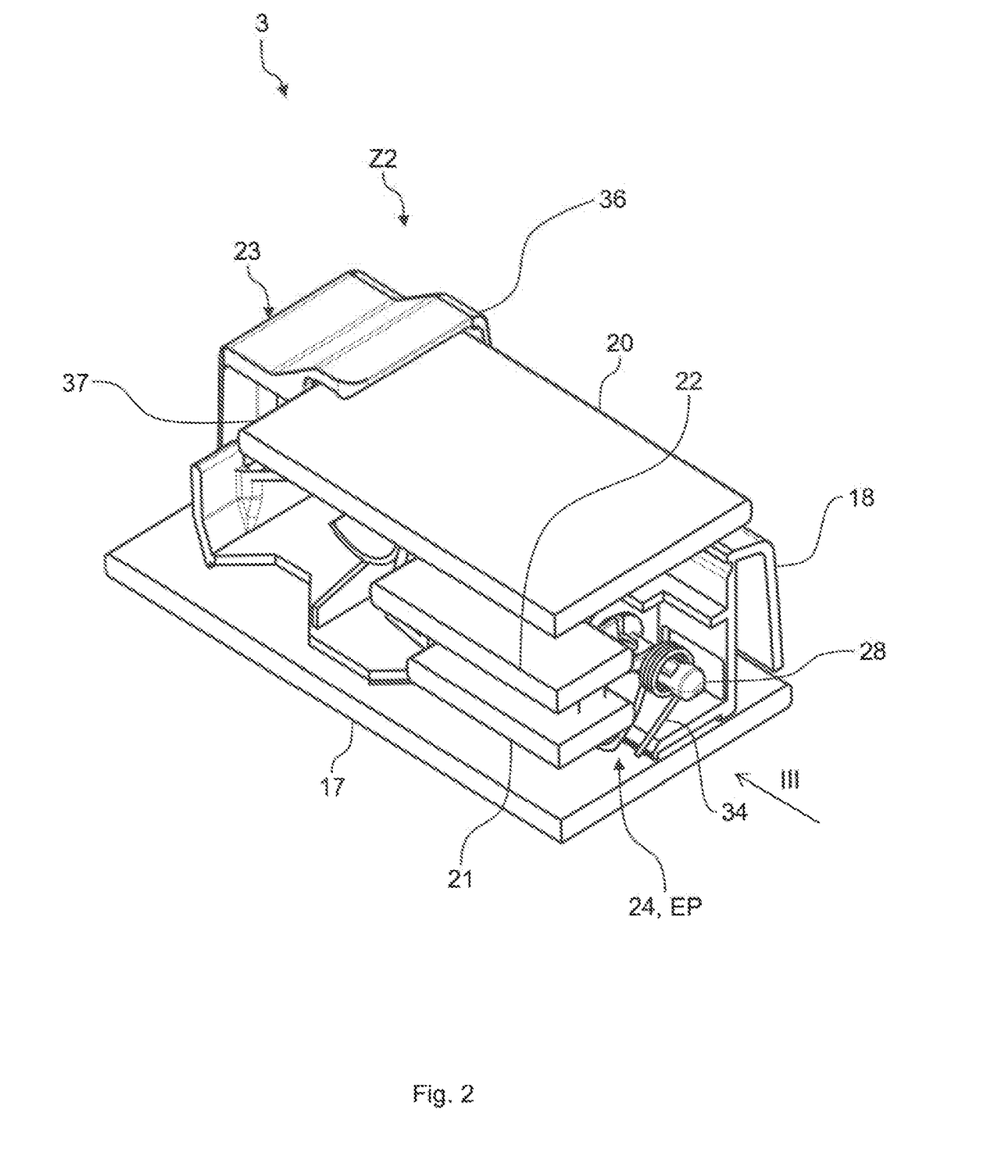
FIG. 2 shows a schematic perspective part view of an embodiment of a door for the household cooking appliance in accordance with FIG. 1.
Figure 3:
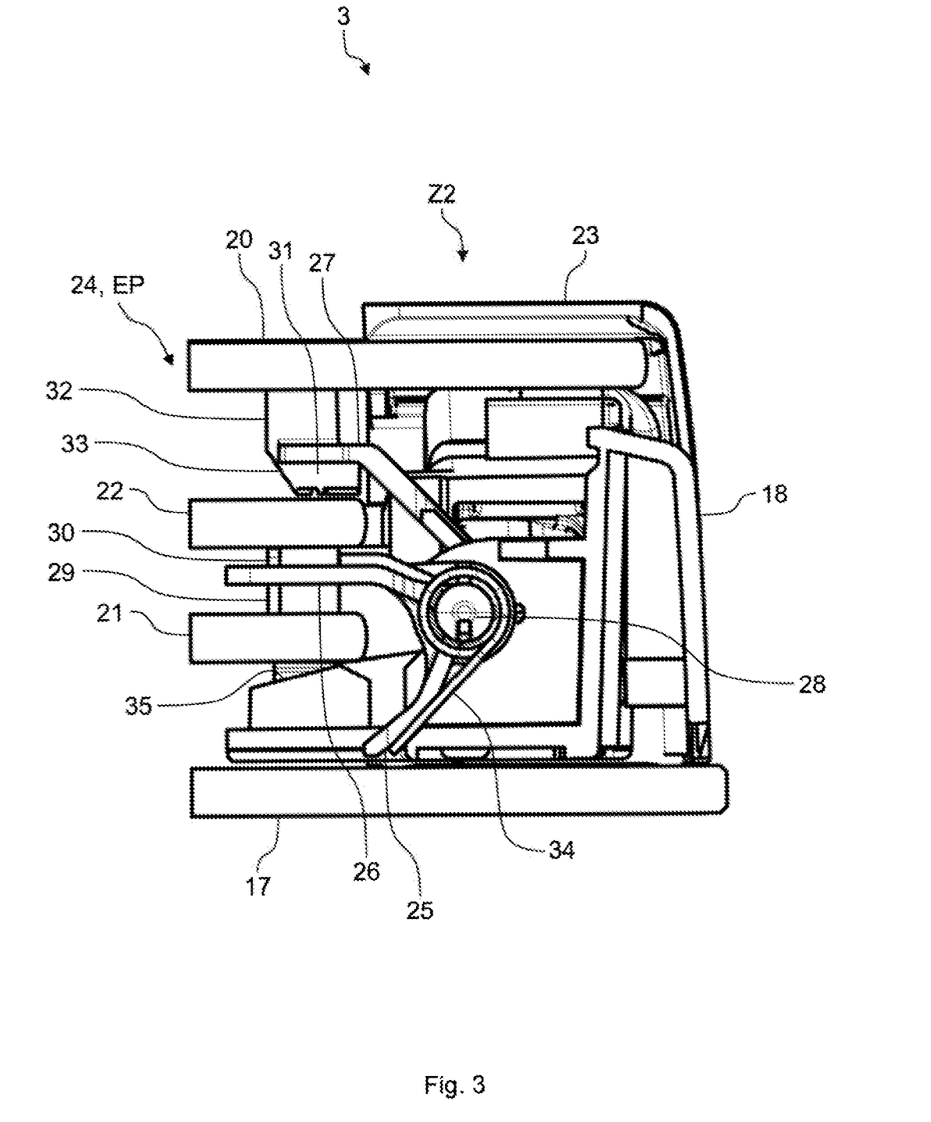
FIG. 3 shows the view III in accordance with FIG. 2.

FIG. 2 illustrates a schematic perspective part view of an embodiment of a door 3 as mentioned above. FIG. 3 illustrates the view III in accordance with FIG. 2. Reference is made below simultaneously to FIGS. 2 and 3.

As mentioned above, the door 3 comprises the outer pane 17 and the door beams 18, 19 are affixed to the rear side of the outer pane, only the first door beam 18 of the door beams is illustrated in FIGS. 2 and 3. In addition to the outer pane 17, the door 3 comprises an inner pane 20 that faces the cooking compartment 2. A first intermediate pane 21 and also a second intermediate pane 22 are provided between the outer pane 17 and the inner pane 20. The number of the intermediate panes 21, 22 is essentially arbitrary. The first intermediate pane 21 is arranged closer to the outer pane 17 than the second intermediate pane 22. Accordingly, the second intermediate pane 22 is arranged closer to the inner pane 20 than the first intermediate pane 21. The inner pane 20 is held by a locking facility 23 that can be displaced along the first door beam 18. The locking facility 23 can also be referred to as a sliding cap.

During the operation of the household cooking appliance 1, in particular during the pyrolysis operation, air circulates between the outer pane 17 and the first intermediate pane 21 and also between the first intermediate pane 21 and the second intermediate pane 22. A stationary air cushion is provided between the second intermediate pane 22 and the inner pane 20. This is used for thermal insulation. This stationary air cushion is however not mandatorily required. It is possible for dirt to be deposited on the intermediate panes 21, 22, the inner pane 20 and/or on the outer pane 17. It is therefore possible, as is further explained below, for a user to remove the inner pane 20 and the intermediate panes 21, 22 from the door 3 for cleaning.

Figure 4:
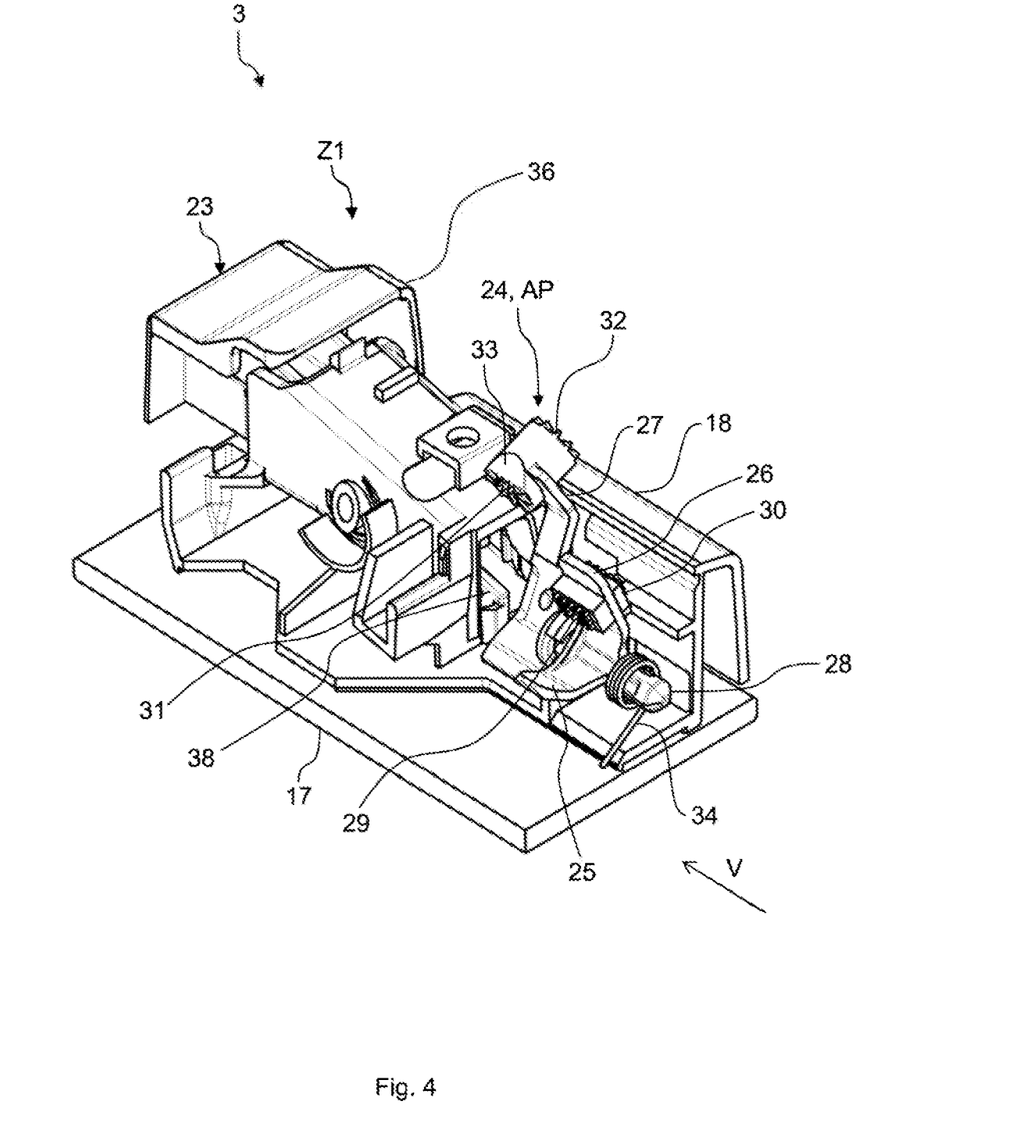
FIG. 4 shows a further schematic perspective part view of the door in accordance with FIG. 2.
Figure 5:
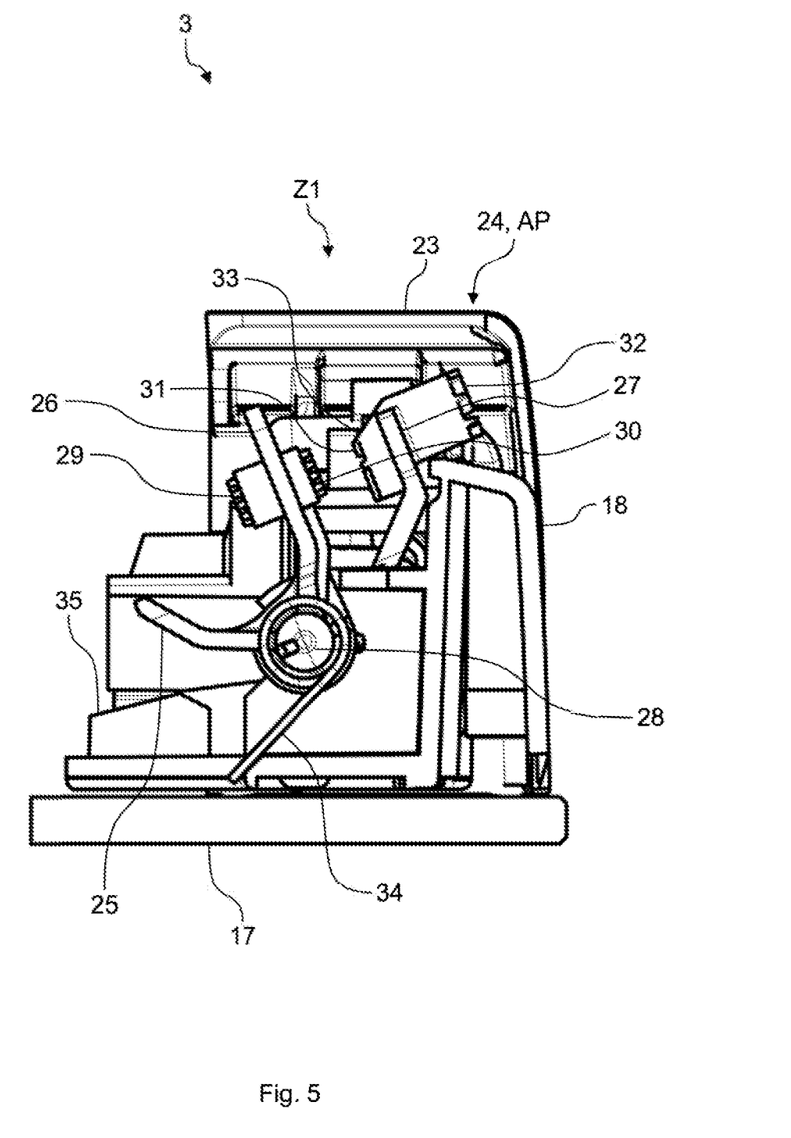
FIG. 5 shows the view V in accordance with FIG. 4.

FIG. 4 illustrates a further schematic perspective part view of the door 3 in accordance with FIG. 2. FIG. 5 illustrates the view V in accordance with FIG. 4. Reference is made below to FIGS. 4 and 5 simultaneously.

In order to mount and dismount the inner pane 20 and also the intermediate panes 21, 22, the door 3 comprises a pane checking facility 24. The pane checking facility 24 is suitable for positioning the inner pane 20 and the intermediate panes 21, 22 on the door 3 and thus for mounting or checking whether the intermediate panes 21, 22 are mounted or not. With the aid of the pane checking facility 24, it is possible for the door 3 to also be dismounted again. The pane checking facility 24 can also be referred to as a mounting and dismounting facility. The pane checking facility 24 can also be referred to as a pane receiving arrangement or pane receiving facility. The pane checking facility 24 is fixedly connected to the door 3, in particular fixedly connected to the first door beam 18. It is preferred that a pane checking facility 24 of this type is provided on each door beam 18, 19. However, only one pane checking facility 24 is discussed below.

The pane checking facility 24 comprises a first arm 25, a second arm 26 and also a third arm 27. The arms 25 to 27 are fixedly connected to one another. Moreover, the pane checking facility 24 comprises a pivot axis 28 about which the pane checking facility 24 is mounted on the first door beam 18 in a pivotable manner. It is however not necessary for the pane checking facility 24 to be rotatably mounted on the first door profile 18. The pane checking facility 24 can also be mounted on any arbitrary other component of the door 3 so as to be rotatable about the pivot axis 28. The arms 25 to 27 are fixedly connected to the pivot axis 28. In particular, the arms 25 to 27 and the pivot axis 28 form a one-piece component. "One-piece" or "single piece" in the present case means that the pane checking facility 24 is not combined from multiple individual components but rather that the arms 25 to 27 and the pivot axis 28 form a common component. The third arm 27 is used in particular so as to fasten and attach or position a damping element or buffer that is yet to be explained below. The damping element or the buffer can be integrated into a soft component. This means that the third arm 27 itself can be produced from a soft component.

In particular, the arms 25 to 27 and the pivot axis 28 form a materially single-piece component. "Materially single-piece" in the present case means that the arms 25 to 27 and the pivot axis 28 are produced from the same material throughout. The third arm 27 can alternatively also be produced from another material, in particular from a silicone rubber or from another soft component. For example, the pane checking facility 24 is a plastic injection molded component. The first arm 25 and the second arm 26 are attached to the pivot axis 28 in such a manner that the arms 25, 26 in the view in accordance with FIG. 5 form a U-shaped or C-shaped geometry. The third arm 27 is positioned adjacent to the arms 25, 26 when viewed along the pivot axis 28.

The second arm 26 comprises a first damping element 29, which faces the first arm 25, and also a second damping element 30 that is remote from the first arm 25. The damping elements 29, 30 are cuboid or block-shaped. The second arm 26 is arranged between the damping elements 29, 30. In lieu of two damping elements 29, 30 it is also possible to provide a single continuous damping element.

The damping elements 29, 30 can be produced from a different material than the second arm 26. For example, the damping elements 29, 30 are produced from a thermoplastic elastomer (TPE), in particular from a thermoplastic polyurethane (TPU). In this regard, the pane checking facility 24 can be produced for example with the aid of a two-component plastic injection molding method. A third damping element 31, which faces the second arm 26, and a fourth damping element 32, which is remote from the second arm 26, are allocated to the third arm 27. The damping elements 31, 32 can be produced from a different material than the third arm 27. For example, the damping elements 31, 32 are produced from a TPE, in particular from a TPU. In lieu of two damping elements 31, 32, it is also possible to provide a single continuous damping element. A lead-in chamfer 33 is provided on the third damping element 31. The damping elements 29 to 32 can also be produced from a silicone rubber, for example from a so-called liquid silicone rubber (LSR), an HTV silicone or an RTV silicone. The damping elements 29 to 32 function as a spacer. The damping elements 29 to 32 can also be referred to as spacers or spacing elements.

A spring element 34 is allocated to the pane checking facility 24 and the pivot axis 28 is at least in sections received in the spring element. The spring element 34 can be part of the pane checking facility 24. The spring element 34 can be a coil spring or a leaf spring. The spring element 34 is in particular a cylindrical helical coiled spring. The spring element 34 is a torsion spring. This means that the spring element 34 can generate a torque that acts upon the pivot axis 28. The spring element 34 stresses the pane checking facility 24 with respect to the first door beam 18 in such a manner that the pane checking facility 24 remains in a starting position AP that is illustrated in FIGS. 4 and 5. In the starting position AP, the spring element 34 is approximately relaxed. The spring element 34 however in the starting position AP is prestressed to a minimal extent with the result that the pane checking facility 24 remains in the starting position AP. A supporting section 35 is provided on the first door beam 18 and the first intermediate pane 21 can lie on the supporting section.

Now returning to the locking facility 23, this can be brought from an unlocked state Z1, which is illustrated in FIGS. 4 to 9, in which the locking facility 23 does not engage around the inner pane 20 and also is not in contact with this inner pane, into a locked state Z2, which is illustrated in FIGS. 2 and 3, in which the locking facility 23 engages around the inner pane 20 and thus fixes the inner pane to the door 3. For this purpose, the locking facility 23 can be displaced along the first door beam 18. In the locked state Z2, the locking facility 23 is latched to the first door beam 18 with the result that the locking facility 23 cannot independently bring itself from the locked state Z2 into the unlocked state Z1. In order to bring the locking facility 23 from the locked state Z2 into the unlocked state Z1, initially a button that is not illustrated is to be actuated, which unblocks the locking facility 23 with the result that this locking facility can be displaced along the first door beam 18.

The locking facility 23 is preferably a one-piece, in particular a materially single-piece, plastic component, in particular a plastic injection molded component. The locking facility 23 comprises a pocket-shaped engaging section 36 that in the locked state Z2 engages around an upper edge 37 of the inner pane 20. Moreover, the locking facility 23 has a rod-shaped or strip-shaped locking section 38 that, as is further explained below, cooperates with the pane checking facility 24.

Figure 6:
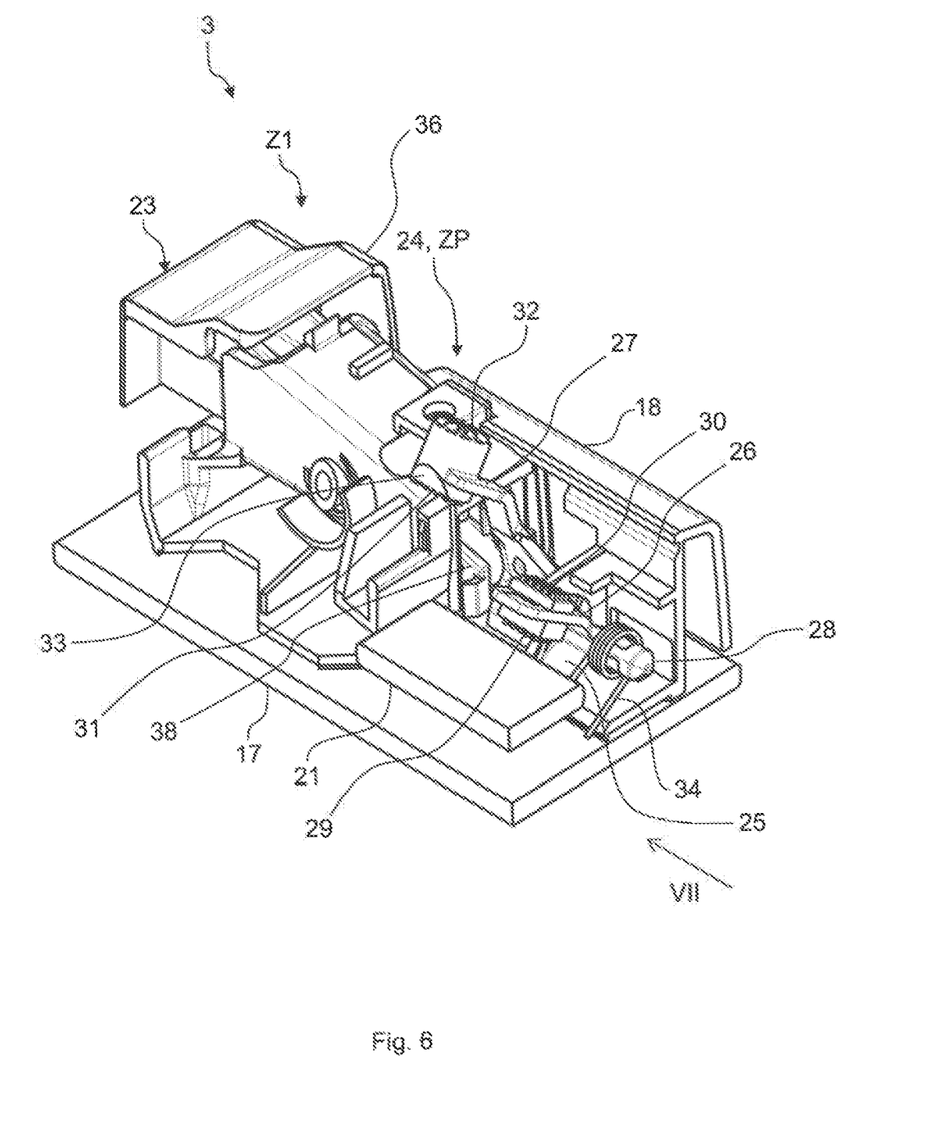
FIG. 6 shows a further schematic perspective part view of the door in accordance with FIG. 2.
Figure 7:
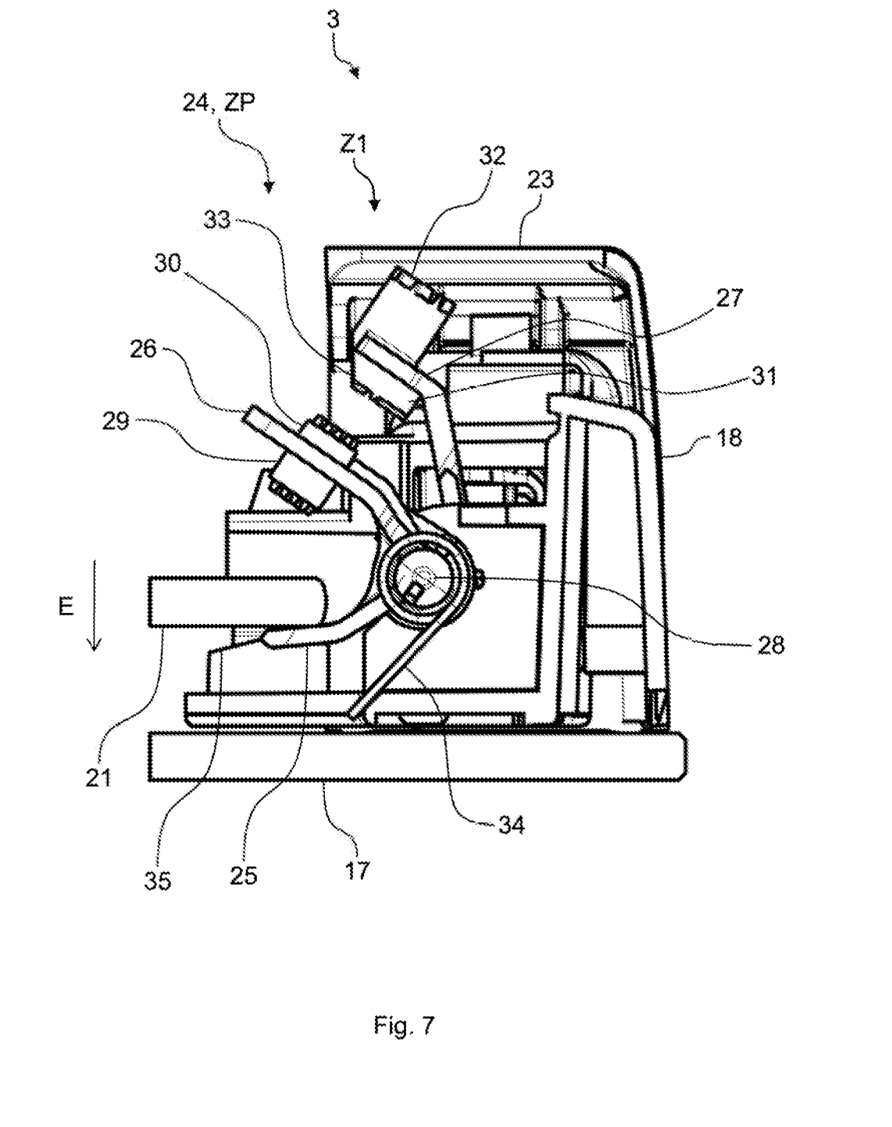
FIG. 7 shows the view VII in accordance with FIG. 6.
Figure 8:
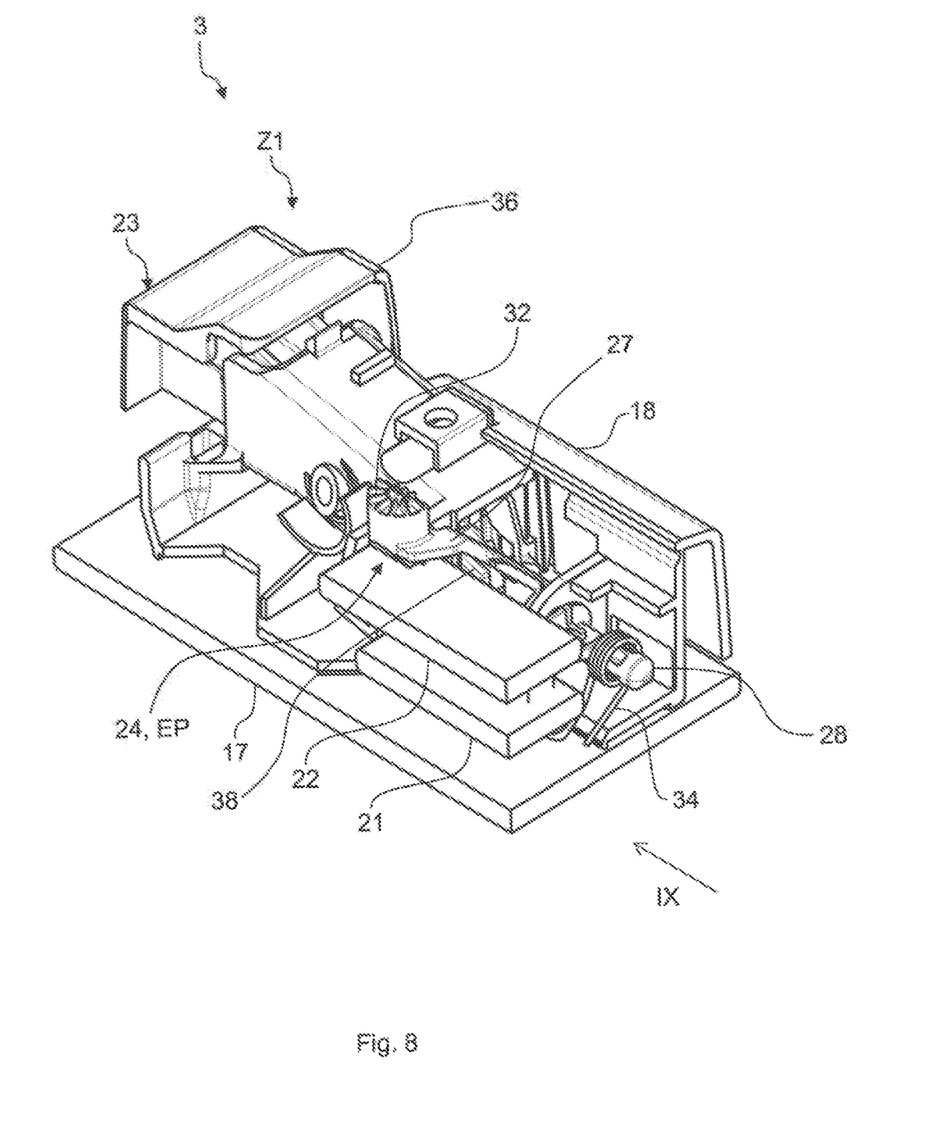
FIG. 8 shows a further schematic perspective part view of the door in accordance with FIG. 2.
Figure 9:
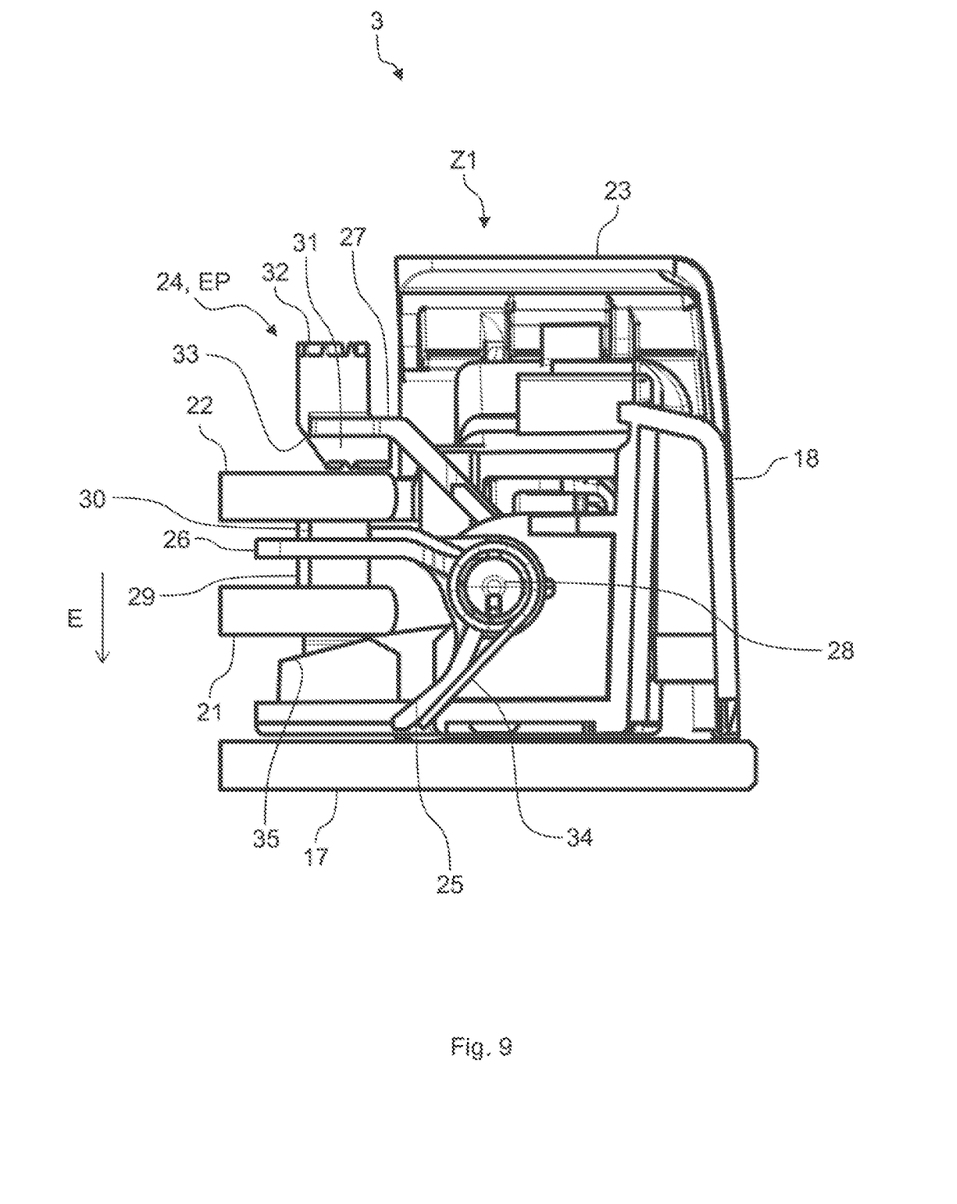
FIG. 9 shows the view IX in accordance with FIG. 8.

FIG. 6 illustrates a further schematic perspective part view of the door 3. FIG. 7 illustrates the view VII in accordance with FIG. 6. FIG. 8 illustrates a further schematic perspective part view of the door 3. FIG. 9 illustrates the view IX in accordance with FIG. 8. The functionality of the pane checking facility 24 is explained below with the aid of FIGS. 2 to 9.

Initially, the pane checking facility 24 is located in the starting position AP that is illustrated in FIGS. 4 and 5. In this case the locking section 38 is blocked by the pane checking facility 24 in such a manner that the locking facility 23 cannot be brought from the unlocked state Z1 into the locked state Z2. The locking facility 23 can only be inserted so far into the first door beam 18 until the locking section 38 abuts the pane checking facility 24.

As is illustrated in FIGS. 6 and 7, the first intermediate pane 21 is inserted in the direction of insertion E in the direction of the outer pane 17. In this case, the first intermediate pane 21 lies against the first arm 25 whereby the pane checking facility 24 twists out of the starting position AP that is illustrated in FIGS. 4 and 5 into an intermediate position ZP that is illustrated in FIGS. 6 and 7 and in this case engages around the first intermediate pane 21. In this case, the spring element 34 is stressed. The pane checking facility 24 in this case is twisted so far counterclockwise until the first intermediate pane 21 lies on the supporting section 35. The pane checking facility 24 still blocks the locking section 38 with the result that the locking facility 23 cannot be inserted into the first door beam 18.

Subsequently, as is illustrated in FIGS. 8 and 9, the second intermediate pane 22 is inserted in the direction of insertion E in the direction of the outer pane 17. The insertion of the second intermediate pane 22 is facilitated by the lead-in chamfer 33. As the second intermediate pane 22 is being inserted, the second intermediate pane 22 comes to rest on the second damping element 30 of the second arm 26 in such a manner that the pane checking facility 24 moves from the intermediate position ZP into an end position EP in which the second arm 26 is arranged between the first intermediate pane 21 and the second intermediate pane 22. The second intermediate pane 22 is also engaged by the pane checking facility 24 as the second intermediate pane is being brought from the intermediate position ZP into the end position EP. In this case, the first damping element 29 lies against the first intermediate pane 21 and the second damping element 30 lies against the second intermediate pane 22. The damping elements 29, 30 can be compressed in this case. Moreover, the third arm 27 is also pivoted in such a manner that the second intermediate pane 22 is arranged between the second arm 26 and the third arm 27.

In the end position EP, the pane checking facility 24 no longer blocks the locking section 38 of the locking facility 23 with the result that the user could bring the locking facility 23 from the unlocked state Z1 into the locked state Z2. Since the inner pane 20 is however obviously missing, it is clear for the user that initially the inner pane 20 is still to be placed on the door 3 before the locking facility 23 is brought from the unlocked state Z1 into the locked state Z2. With the aid of the cooperation of the locking facility 23 and the pane checking facility 24 it is consequently possible to perform an automated check as to whether the intermediate panes 21, 22 are correctly mounted.

Finally, as is illustrated in FIGS. 2 and 3, the inner pane 20 is placed onto the third arm 27, in particular onto the fourth damping element 32. In this case, the third arm 27 can elastically deform in such a manner that the third damping element 31 lies against the second intermediate pane 22 and the fourth damping element 32 lies against the inner pane 20. The damping elements 31, 32 in this case can be compressed. In this case, the third arm 27 is optional. The function of the third arm 27 is to receive and position the damping elements 31, 32 between the second intermediate pane 22 and the inner pane 20. As the inner pane 20 is being mounted, the damping elements 31, 32 are compressed. After the inner pane 20 is mounted, the locking facility 23 is inserted into the first door beam 18 with the result that the locking facility 23 fixes the inner pane 20 and presses against the fourth damping element 32.

In this case, the locking facility 23 in part engages around the inner pane 20. The locking section 38 fixes the pane checking facility 24 in the end position EP. For this purpose the locking section 38 engages behind the third arm 27. The locking section 38 consequently engages in a positive-locking manner into the pane checking facility 24. A positive-locking connection results due to the engagement of two connecting partners into one another or behind, in the present case the locking section 38 and the pane checking facility 24.

The advantages of the door 3 are explained below. With the aid of the cooperation of the locking facility 23 and the pane checking facility 24 it is possible to perform a simple and automated check as to whether the intermediate panes 21, 22 are correctly mounted. If just one intermediate pane 21, 22 is missing, it is not possible to bring the locking facility 23 from the unlocked state Z1 into the locked state Z2. The locking facility 23 is advantageously connected in a non-detachable manner to the first door beam 18. It is not possible to entirely close the door 3 as long as the locking facility 23 is not located in the locked state Z2. It is consequently displayed to the user that the door 3 is not entirely mounted. Since such a locking facility 23 is provided on both door beams 18, 19, it is also possible to actuate these locking facilities separately from one another. This simplifies the handling. Moreover, a doubled protection is thereby possible. The locking facility 23 can be actuated without tools. This means that the door 3 can also be dismounted and mounted without tools.

The door 3 can be dismounted and mounted both in a state in which the door is attached to the cooking compartment 2 as well as in a state in which the door is removed from the cooking compartment 2. With the aid of the locking facility 23 it is possible to achieve an increased operational safety. An improved thermal insulation is provided due to the use of the two intermediate panes 21, 22 whereby the adhesive, which is used so as to affix the door beams 18, 19 to the outer pane 17, and also the plastic parts, in particular the door beams 18, 19, the locking facility 23 and the pane checking facility 24, of the door 3 are not thermally overloaded. The locking facility 23 and the pane checking facility 24 are connected to the door 3 in a non-detachable manner.

Although the present invention has been described with the aid of exemplary embodiments, the invention can be modified in diverse ways.

The invention claimed is:

1. A door for a household cooking appliance, said door comprising:
   an outer pane;
   an inner pane;
   an intermediate pane arranged between the outer pane and the inner pane;
   a pane checking facility mounted on the door for rotation about a pivot axis from a starting position into an end position when the intermediate pane is inserted in a direction of the outer pane; and
   a locking facility mounted so as to be displaceable on the door from an unlocked state, in which the locking facility is out of engagement with the inner pane, into a locked state, in which the locking facility engages around the inner pane at least in one section, said locking facility being displaceable from the unlocked state into the locked state only when the pane checking facility is located in the end position.

2. The door of claim 1, further comprising a door beam fixedly or detachably connected to the outer pane.

3. The door of claim 2, wherein the pane checking facility is mounted on the door beam for rotation about the pivot axis.

4. The door of claim 1, wherein the locking facility is mounted for displacement on the door beam.

5. The door of claim 4, wherein the locking facility is displaceable along the door beam from the unlocked state into the locked state.

6. The door of claim 4, wherein the locking facility comprises a locking section that cooperates with the pane checking facility such that the locking section is blocked by the pane checking facility when the pane checking facility is not located in the end position and such that the locking section is not blocked by the pane checking facility when the pane checking facility is located in the end position.

7. The door of claim 6, wherein the locking section comprises a rod-shaped locking section or a strip-shaped locking section.

8. The door of claim 6, wherein, when the pane checking facility is located in the end position and the locking facility is in the locked state, the locking section blocks the pane checking facility from rotating about the pivot axis from the end position toward the starting position.

9. The door of claim 6, wherein the locking section is configured to engage in the locked state of the locking facility in a positive-locking manner into the pane checking facility in the locked state.

10. The door of claim 6, wherein the pane checking facility comprises one or more arms, said intermediate pane lying on an arm of the one or more arms when the intermediate pane is inserted in the direction of the outer pane so that the pane checking facility pivots about the pivot axis, and
   wherein, in the locked state of the locking facility, the locking section engages around or engages behind the arm of the pane checking facility.

11. The door of claim 2, wherein the door beam is adhesively bonded to the outer pane.

12. The door of claim 2, wherein the door beam is produced from a plastic material.

13. The door of claim 2, wherein the door beam includes a first door beam and a second door beam, with the pane checking facility and the locking facility being connected to one of the first and second door beams, and further comprising a further pane checking facility, and a further locking facility, with the further pane checking facility and the further locking facility being connected to the other one of the first and second door beams.

14. The door of claim 1, wherein the pane checking facility comprises a spring element that prestresses the pane checking facility in a direction of the starting position.

15. The door of claim 1, wherein the locking facility comprises a locking section that is configured to engage in the locked state of the locking facility in a positive-locking manner into the pane checking facility in the locked state.

16. The door of claim 15, wherein the pane checking facility comprises multiple arms, said intermediate pane lying on one of the arms when the intermediate pane is inserted in the direction of the outer pane so that the pane checking facility pivots about the pivot axis.

17. The door of claim 16, wherein in the locked state of the locking facility the locking section engages around or engages behind one of the arms.

18. The door of claim 1, wherein the intermediate pane includes a first intermediate pane and a second intermediate pane, with the first intermediate pane arranged between the outer pane and the second intermediate pane, and with the second intermediate pane arranged between the inner pane and the first intermediate pane, said pane checking facility being rotatably mounted on the door for pivoting about the pivot axis from the starting position into an intermediate position when the first intermediate pane is inserted in the direction of the outer pane, and for pivoting about the pivot axis from the intermediate position into the end position when the second intermediate pane is inserted in the direction of the outer pane.

19. The door of claim 1, wherein the pivot axis is oriented parallel to a y-direction of the door or parallel to an x-direction of the door.

20. A household cooking appliance, comprising:
   a cooking compartment; and
   a door that fastened to the cooking compartment, said door comprising an outer pane, an inner pane, an intermediate pane arranged between the outer pane and the inner pane, a pane checking facility mounted on the door for rotation about a pivot axis from a starting position into an end position when, the intermediate pane is inserted in a direction of the outer pane, and a locking facility mounted so as to be displaceable on the door from an unlocked state, in which the locking facility is out of engagement with the inner pane, into a locked state, in which the locking facility engages around the inner pane at least in one section, said locking facility being displaceable from the unlocked state into the locked state only when the pane checking facility is located in the end position.

* * * * *